United States Patent
Liu et al.

(10) Patent No.: US 9,519,374 B2
(45) Date of Patent: Dec. 13, 2016

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Hailin Xue, Beijing (CN); Haisheng Wang, Beijing (CN); Lei Wang, Beijing (CN); Shengji Yang, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 24 days.

(21) Appl. No.: 14/443,561

(22) PCT Filed: Sep. 20, 2014

(86) PCT No.: PCT/CN2014/087003
§ 371 (c)(1),
(2) Date: May 18, 2015

(87) PCT Pub. No.: WO2015/180312
PCT Pub. Date: Dec. 3, 2015

(65) Prior Publication Data
US 2016/0274716 A1    Sep. 22, 2016

(30) Foreign Application Priority Data
May 30, 2014   (CN) .......................... 2014 1 0240043

(51) Int. Cl.
*G06F 3/041* (2006.01)
*G06F 3/044* (2006.01)
(Continued)

(52) U.S. Cl.
CPC ......... *G06F 3/0416* (2013.01); *G02F 1/13338* (2013.01); *G02F 1/13439* (2013.01);
(Continued)

(58) Field of Classification Search
CPC .................. G06F 3/044; G06F 3/0412; G06F 2003/04103; G06F 3/041; G06F 3/0416; G02F 1/13338
See application file for complete search history.

(56) References Cited

U.S. PATENT DOCUMENTS

2010/0194707 A1*  8/2010  Hotelling .............. G06F 3/0412
                                                    345/173
2011/0096019 A1*  4/2011  Tsai ....................... G06F 3/0412
                                                    345/174
(Continued)

FOREIGN PATENT DOCUMENTS

| CN | 103279245 A | 9/2013 |
| CN | 103513843 A | 1/2014 |
| CN | 104020893 A | 9/2014 |

OTHER PUBLICATIONS

International Search Report mailed Nov. 3, 2015; PCT/CN2014/087003.
(Continued)

Primary Examiner — Viet Pham
(74) Attorney, Agent, or Firm — Ladas & Parry LLP

(57) ABSTRACT

An in-cell touch panel and a display device are disclosed. The in-cell touch panel includes: an upper substrate and a lower substrate arranged opposite to each other, a plurality of mutually independent self-capacitance electrodes
(Continued)

arranged in the same layer, and a plurality of leads configured to connect the self-capacitance electrodes to a touch detection chip. The self-capacitance electrodes and the plurality of leads are arranged in different layers; an interlayer insulating layer is disposed between the self-capacitance electrodes and the leads; each self-capacitance electrode is electrically connected with the lead via a through hole running through the interlayer insulating layer; and the interlayer insulating layer is provided with recessed portions at overlapped areas of the self-capacitance electrodes and the leads other than the leads electrically connected with the self-capacitance electrodes. Therefore, the uniformity of display images of the touch panel can be improved.

20 Claims, 6 Drawing Sheets

(51) Int. Cl.
*G09G 3/36* (2006.01)
*G02F 1/1333* (2006.01)
*G02F 1/1343* (2006.01)
*G02F 1/1362* (2006.01)

(52) U.S. Cl.
CPC .. *G02F 1/133345* (2013.01); *G02F 1/134309* (2013.01); *G02F 1/136286* (2013.01); *G06F 3/044* (2013.01); *G06F 3/0412* (2013.01); *G09G 3/3677* (2013.01); *G09G 3/3688* (2013.01); *G02F 2001/134345* (2013.01); *G06F 2203/04103* (2013.01); *G06F 2203/04111* (2013.01); *G06F 2203/04112* (2013.01); *G09G 2300/0809* (2013.01); *G09G 2310/0202* (2013.01)

(56) References Cited

U.S. PATENT DOCUMENTS

| 2012/0162584 | A1* | 6/2012 | Chang | G06F 3/0412 349/106 |
| 2012/0218199 | A1* | 8/2012 | Kim | G06F 3/0412 345/173 |
| 2013/0155007 | A1 | 6/2013 | Huang et al. | |

OTHER PUBLICATIONS

Written Opinion of the International Searching Authority mailed Mar. 11, 2015; PCT/CN2014/087003.

* cited by examiner

IN-CELL TOUCH PANEL AND DISPLAY DEVICE

TECHNICAL FIELD

Embodiments of the present invention relate to an in-cell touch panel and a display device.

BACKGROUND

With the rapid development of display technology, touch screen panels have been gradually widespread in people's lives. Currently, in accordance with structures, the touch screen panels can be divided into: add-on mode touch panels, on-cell touch panels and in-cell touch panels. The add-on mode touch panel needs to separately produce a touch screen and a liquid crystal display (LCD) which are bonded together to form an LCD with touch function later. The add-on mode touch panel has the defects of high manufacturing costs, low light transmittance, thick modules, etc. The in-cell touch panel allows touch electrodes of a touch screen to be embedded into an LCD, not only can reduce the overall thickness of a module but also can greatly reduce the manufacturing costs of the touch panel, and is favored by the major panel manufacturers.

The in-cell touch panel detects a finger touch position in accordance with the mutual-capacitance or self-capacitance principle. For instance, a plurality of self-capacitance electrodes arranged in the same layer and insulated from each other may be disposed in the touch panel. When a human body does not touch the screen, the capacitance of the self-capacitance electrode is at a fixed value. When a human body touches the screen, the capacitance of corresponding self-capacitance electrode is at a value obtained from the fixed value plus the body capacitance. The touch detection chip can determine the touch position by the detection of the capacitance variation of the self-capacitance electrode in the touch period. As the body capacitance can act on the entire self-capacitance, compared with the case that the body capacitance can only act on the projected capacitance in the mutual capacitance principle, the touch variation caused by the fact that the human body touches the screen will be greater than that of a touch panel produced in accordance with the mutual-capacitance principle. Compared with a mutual-capacitance touch panel, the self-capacitance touch panel can effectively improve the signal-to-noise ratio of touch and hence improve the accuracy of touch sensing.

In the above-mentioned in-cell touch panel, in order to connect the self-capacitance electrodes and the touch detection chip, leads connected with the self-capacitance electrodes correspondingly will be provided in general. Patterns of the leads and the self-capacitance electrodes may be arranged in the same layer and may also be arranged in different layers. Although a new patterning process is not required to add if the leads and the self-capacitance electrodes are arranged in the same layer, touch blind areas will be produced. As in the touch blind area the leads connected with a plurality of self-capacitance electrodes run through the touch blind area, the signals in the touch blind area are relatively disordered, so that the touch performance in this area can be reduced.

SUMMARY

At least one embodiment of the present invention provides an in-cell touch panel and a display device which can improve the uniformity of display images of the touch panel.

At least one embodiment of the present invention provides an in-cell touch panel, which comprises: an upper substrate and a lower substrate arranged opposite to each other, a plurality of mutually independent self-capacitance electrodes arranged in a same layer, and a plurality of leads configured to connect the self-capacitance electrodes to a touch detection chip. The self-capacitance electrodes and the leads are disposed on one side of the upper substrate facing the lower substrate or one side of the lower substrate facing the upper substrate; the self-capacitance electrodes and the leads are arranged in different layers, and an interlayer insulating layer is disposed between the self-capacitance electrodes and the leads; the self-capacitance electrodes are electrically connected with the leads via through holes running through the interlayer insulating layer; and the interlayer insulating layer is provided with recessed portions at overlapped areas of the self-capacitance electrodes and the leads other than the leads electrically connected with the self-capacitance electrodes.

At least one embodiment of the present invention provides a display device, which comprises the in-cell touch panel provided by at least one embodiment of the present invention.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Thickness and the shape of layers in the accompanying drawings do not reflect the real scale and are only intended to illustrate the content of the present invention.

Figure 1:
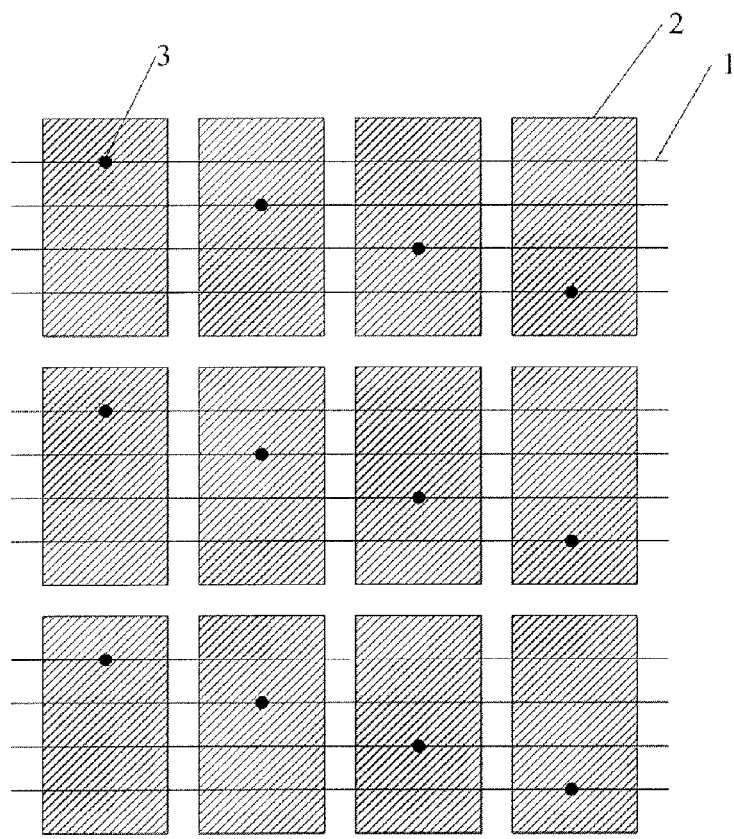
FIG. 1 is a schematic diagram illustrating the connection relationship between self-capacitances and leads.

As touch blind areas will be generated if self-capacitance electrodes and leads are arranged in the same layer, the touch performance in the areas can be lowered. In view of this, as illustrated in FIG. 1, leads 1 and self-capacitance electrodes 2 are generally arranged in different layers and connected with each other via through holes 3. As seen from FIG. 1, the through holes configured to connect the self-capacitance electrodes and corresponding leads are not uniformly distributed in the entire display area, so that the overall uniformity of display images of the touch panel can be affected.

Figure 2A:
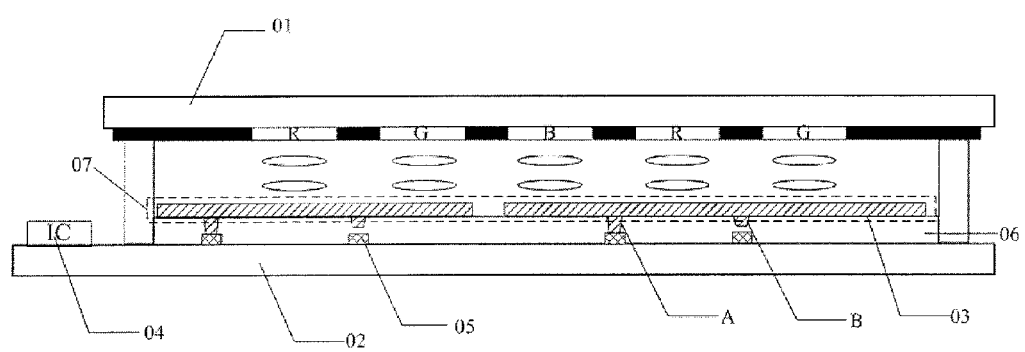
FIGS. 2a and 2b are respectively a schematic structural view of an in-cell touch panel provided by an embodiment of the present invention.
Figure 2B:
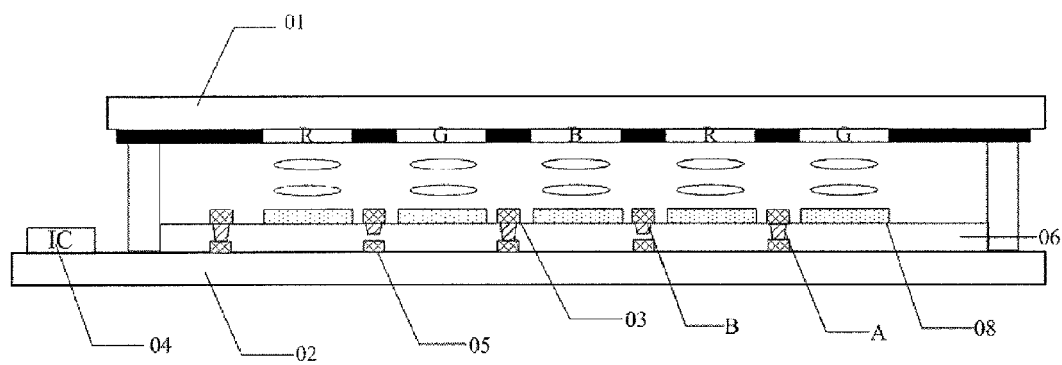

At least one embodiment of the present invention provides an in-cell touch panel. As illustrated in FIGS. 2a and 2b, the in-cell touch panel comprises an upper substrate 01 and a lower substrate 02 arranged opposite to each other, a plurality of mutually independent self-capacitance electrodes 03 arranged in the same layer, and a plurality of leads 05 configured to connect the self-capacitance electrodes 03 to a touch detection chip 04. The in-cell touch panel may further comprise the touch detection chip 4 configured to determine the touch position by the detection of the capacitance variation of the self-capacitance electrode 03 in the touch period. The touch detection chip 04 is, for instance, disposed on the upper substrate 01 or the lower substrate 02. In at least one embodiment of the present invention, the touch detection chip may also be provided independent of the touch panel and is connected to the touch panel by, for instance, a flexible printed circuit board (FPC).

The self-capacitance electrodes 03 and the leads 05 are disposed on one side of the upper substrate 01, which side faces the lower substrate 02 or one side of the lower substrate 02, which side faces the upper substrate 01. FIGS. 2a and 2b illustrate the structure in which the self-capacitance electrodes 03 and the leads 05 are disposed on one side of the lower substrate 02 facing the upper substrate 01.

The self-capacitance electrodes 03 and the leads 05 are arranged in different layers, and an interlayer insulating layer 06 is disposed between the self-capacitance electrodes 03 and the leads 05.

The self-capacitance electrodes 03 are electrically connected with the leads 05 via through holes A running through the interlayer insulating layer 06. The interlayer insulating layer 06 is provided with recessed portions B at the overlapped areas of the self-capacitance electrodes 03 and the leads 05 other than the leads 05 electrically connected with the self-capacitance electrodes 03.

In the in-cell touch panel provided by at least one embodiment of the present invention, the plurality of mutually independent self-capacitance electrodes 03 arranged in the same layer are disposed in accordance with the self-capacitance principle; the touch detection chip 04 can determine the touch position by the detection of the capacitance variation of the self-capacitance electrode 03 in the touch period; the self-capacitance electrodes 03 and the leads 05 configured to connect the self-capacitance electrodes 03 to the touch detection chip 04 are arranged in different layers; the interlayer insulating layer 06 is disposed between the self-capacitance electrodes 03 and the leads 05; and the self-capacitance electrodes 03 are electrically connected with the leads 05 via the through holes A running through the interlayer insulating layer 06. Pseudo through holes are formed at the overlapped areas of the interlayer insulating layer 06 at which the self-capacitance electrodes 03 and the leads 05 are not connected, namely the interlayer insulating layer 06 is provided with the recessed portions B at the overlapped areas of each self-capacitance electrode 03 and the leads 05 other than the lead 05 electrically connected with the self-capacitance electrodes 03. The recessed portions B do not expose the leads 05 below them. By the additional arrangement of the pseudo through holes matched with the through holes A in the interlayer insulating layer 06, the pattern uniformity of the entire display area is guaranteed, and hence the uniformity of display images of the touch panel can be improved.

It should be noted that: in the touch panel provided by the at least one embodiment of the present invention, the interlayer insulating layer 06 disposed between the self-capacitance electrodes 03 and the leads 05 may be formed of a plurality of insulating layers or may be formed by one insulating layer. The insulating layer may include inorganic or organic insulating layer(s). No limitation will be given here. The through hole A formed in the interlayer insulating layer 06 refers to a hole running through the insulating layers of the interlayer insulating layer 06. The recessed portion B formed in the interlayer insulating layer 06 refers to a recess which does not fully run through the interlayer insulating layer 06.

Figure 3:
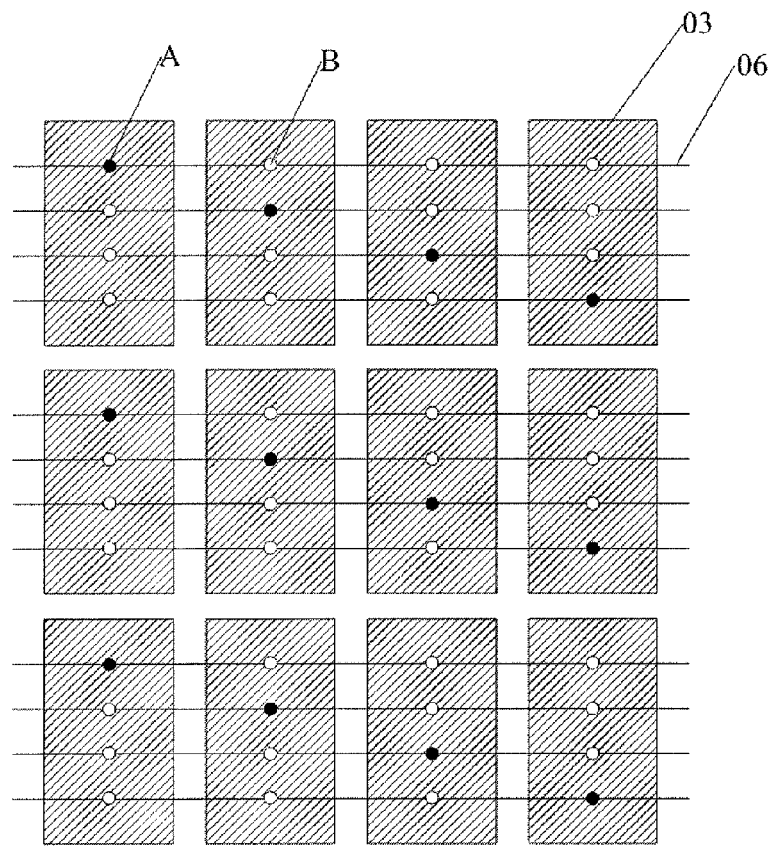
FIG. 3 is a schematic diagram illustrating the connection relationship between self-capacitance electrodes and leads in the in-cell touch panel provided by an embodiment of the present invention.

Moreover, in order to ensure the pattern uniformity of the display area of the touch panel, in the process of forming the through holes A and the recessed portions B in the interlayer insulating layer 06, the through holes A and the recessed portions B may be designed to have same cross sectional shape, for instance, may be designed to be circles with a same diameter. For instance, generally, the through holes A and the recessed portions are designed to be uniformly distributed in the interlayer insulating layer 06, as shown in FIG. 3.

The touch panel provided by the embodiment of the present invention not only is applicable to twisted nematic (TN) LCDs but also is applicable to advanced dimension switch (ADS) LCDs and in-plane switch (IPS) LCDs.

Moreover, when the touch panel provided by at least one embodiment of the present invention is applicable to the traditional ADS LCD panel, a common electrode layer, formed as a plate electrode, is disposed on the lower layer (closer to a base substrate) and pixel electrodes, formed as slit electrodes, are disposed on the upper layer (closer to a liquid crystal layer), namely the common electrode layer is disposed between the pixel electrodes and the lower substrate. Moreover, an insulating layer is usually disposed between the pixel electrodes and the common electrode layer.

When the touch panel provided by at least one embodiment of the present invention is applied to an HADS LCD panel, a pixel electrode, as a plate electrode, is disposed on the lower layer (closer to a base substrate) and a common electrode layer, as slit electrodes, is disposed on the upper layer (closer to a liquid crystal layer), namely the pixel electrode is disposed between the common electrode layer and the lower substrate. Moreover, an insulating layer is usually disposed between the pixel electrode and the common electrode layer.

When the touch panel provided by at least one embodiment of the present invention is applied to an ADS LCD, as illustrated in FIG. 2a, a common electrode layer 07 on a lower substrate 02 may be multiplexed as the self-capacitance electrodes 03, namely the self-capacitance electrodes 03 are combined into the common electrode layer 07 disposed on one side of the lower substrate 02 facing the upper substrate 01. In the display period, for instance, the touch detection chip 04 is configured to apply common electrode signals to the self-capacitance electrodes 03; and in the touch period, for instance, the touch detection chip 04 is configured to apply touch signals to the self-capacitance electrodes 03. When the structure of the common electrode layer 07 is multiplexed as the self-capacitance electrodes 03 to achieve the touch function, no additional process is required to be added on the basis of the traditional manufacturing process of an array substrate. Therefore, the manufacturing cost can be reduced and the productivity can be improved.

Or when the touch panel provided by at least one embodiment of the present invention is applied to an HADS LCD panel, as illustrated in FIG. 2b, the self-capacitance electrodes 03 arranged in the same layer as pixel electrodes 08 may be disposed at gaps between the pixel electrodes 08, namely the self-capacitance electrodes 03 and the pixel electrodes 08 on the lower substrate 02 are arranged in the same layer and a pattern of the self-capacitance electrode 03 is disposed at a gap between two adjacent pixel electrodes 08. When the self-capacitance electrodes 03 are formed at the gaps inherently of the pixel electrodes 08, no additional process is required to be added on the basis of the traditional manufacturing process of the array substrate. Therefore, the manufacturing cost can be reduced and the productivity can be improved.

According to the mode of the LCD panel specifically applied by the touch panel, when the common electrode layer 07 is multiplexed as the self-capacitance electrodes 03, the self-capacitance electrodes 03 may have indium tin oxide (ITO) slit electrode structures or ITO plate electrode structures at positions corresponding to opening areas of pixels, namely the self-capacitance electrode 03 is formed by ITO slit electrodes in the RADS mode. Specifically, the ITO slit electrode structure refers to the ITO slit electrodes provided in the opening areas of the pixels. In the ADS mode, the self-capacitance electrode 03 is formed in an ITO plate electrode to satisfy the requirement of liquid crystal display. In this configuration, the self-capacitance electrodes 03 may interact with the electric field of the human body through slit areas of a pixel electrode layer 08. As the specific structure of ADS mode and HADS mode LCD panels involve the prior art, no further description will be given here.

In general, the resolution of the touch panel is generally in millimeter level, so that the density and the occupied area of the self-capacitance electrode 03 may be selected according to the required touch resolution so as to ensure the required touch resolution. Generally, the self-capacitance electrode 03 is designed to be a square electrode with the size of about 5 mm*5 mm. The resolution of a display is usually in micron level. Therefore, for instance, one self-capacitance electrode 03 may correspond to a plurality of pixel units in display.

In the in-cell touch panel provided by at least one embodiment of the present invention, when the common electrode layer 07, the layer of which is entirely disposed on the lower substrate 02, is divided into the plurality of self-capacitance electrodes 03; in order to not affect the normal display function, in the process of dividing the common electrode layer 07, dividing lines will usually be kept away from opening areas for display and are disposed at an area provided with the pattern of a black matrix (BM) layer, namely orthographic projections of gaps between the self-capacitance electrodes 03 on the lower substrate 02 will usually be disposed at gaps of pixel units of the lower substrate 02.

Or in the in-cell touch panel provided by the embodiment of the present invention, when the patterns of the self-capacitance electrodes 03 are disposed at the gaps between the pixel electrodes 08, the pattern of the self-capacitance electrodes 03 is generally set to be a latticed structure taking the pixel electrodes 08 as mesh openings.

For instance, in the in-cell touch panel provided by at least one embodiment of the present invention, no matter the case that the common electrode layer 07 is multiplexed as the self-capacitance electrodes 03 or the case that the self-capacitance electrodes 03 are disposed at the gaps between the pixel electrodes 08, in order to reduce the mutual interference between display signals and touch signals, the time-sharing drive mode in the touch period and the display period is adopted. For instance, in at least one embodiment of the present invention, a display drive chip and a touch detection chip may also be integrated into the same one chip, so that the manufacturing cost can be further reduced.

Figure 4A:
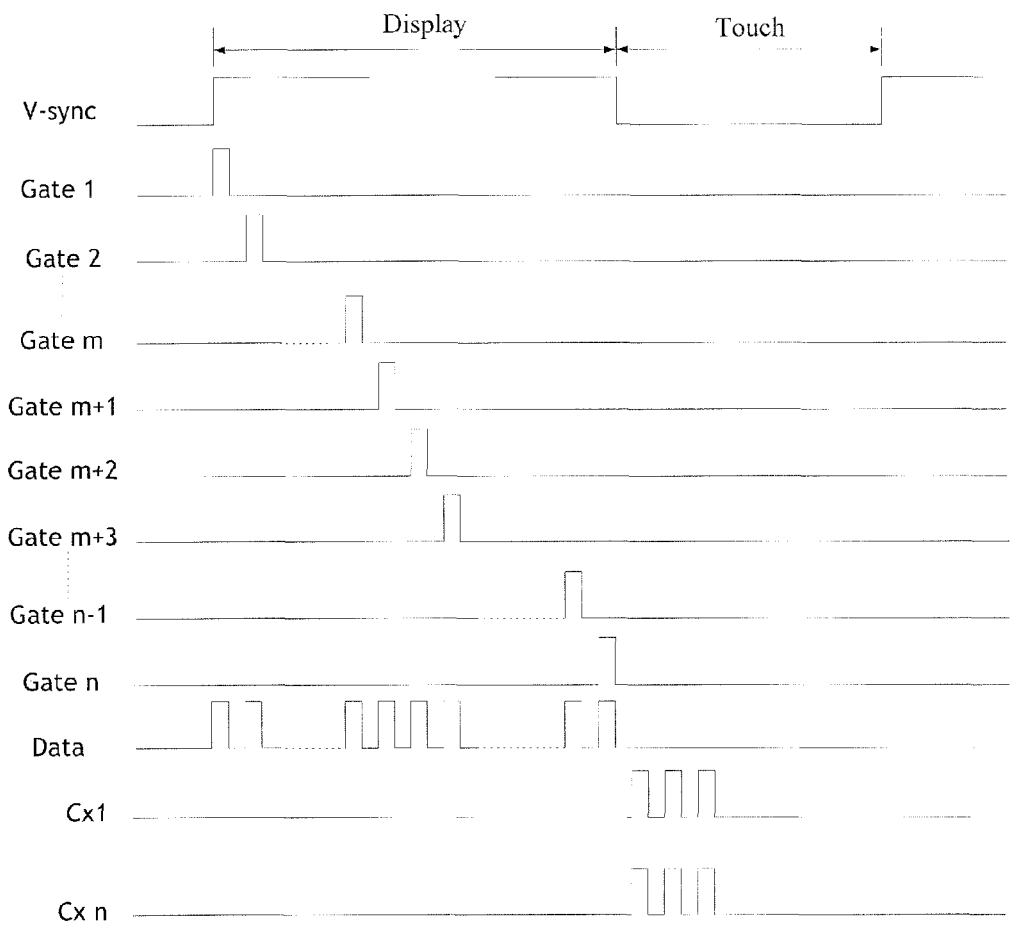
FIGS. 4a and 4b are respectively a drive timing sequence diagram of the in-cell touch panel provided by the embodiment of the present invention.
Figure 4B:
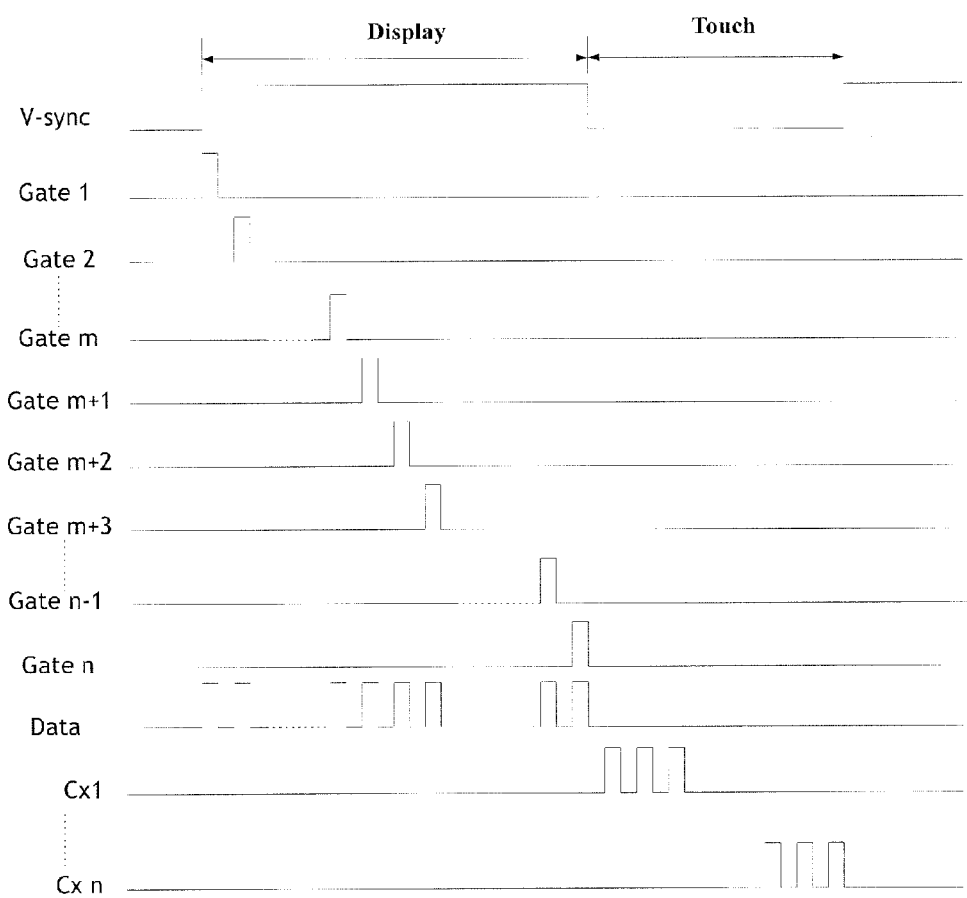

For instance, in the drive timing sequence diagram as shown in FIGS. 4a and 4b, the time of the touch panel for displaying each frame (V-sync) is divided into a display period (Display) and a touch period (Touch). For instance, in the drive timing sequence diagram as shown in FIGS. 4a and 4b, the time of the touch panel for displaying one frame is 16.7 ms, in which 5 ms is selected as the touch period and the rest 11.7 ms is taken as the display period. Of course, the duration of the touch period and the display period may also be appropriately adjusted according to the processing capability of an IC. No specific limitation will be given here. In the display period (Display), a gate scanning signal is applied to each gate signal line Gate 1, Gate 2 . . . Gate n in the touch panel in sequence, and gray-scale signals are applied to data signal lines Data; and when the common electrode layer is multiplexed as the self-capacitance electrodes, the touch detection chip connected with the self-capacitance electrodes Cx 1 . . . Cx n is configured to apply common electrode signals to the self-capacitance electrodes Cx 1 . . . Cx n respectively to achieve the function of liquid crystal display. In the touch period (Touch), as illustrated in FIG. 4a, the touch detection chip connected with the self-capacitance electrodes Cx 1 . . . Cx n is configured to apply drive signals to the self-capacitance electrodes Cx 1 . . . Cx n simultaneously and receive feedback signals of the self-capacitance electrodes Cx 1 . . . Cx n simultaneously; or as illustrated in FIG. 4b, the touch detection chip connected with the self-capacitance electrodes Cx 1 . . . Cx n is configured to apply drive signals to the self-capacitance electrodes Cx 1 . . . Cx n sequentially and receive feedback signals of the self-capacitance electrodes Cx 1 . . . Cx n respectively. No limitation will be given here. Whether touch occurs is determined by the analysis of the feedback signals, so that the touch function can be achieved.

Figure 5:
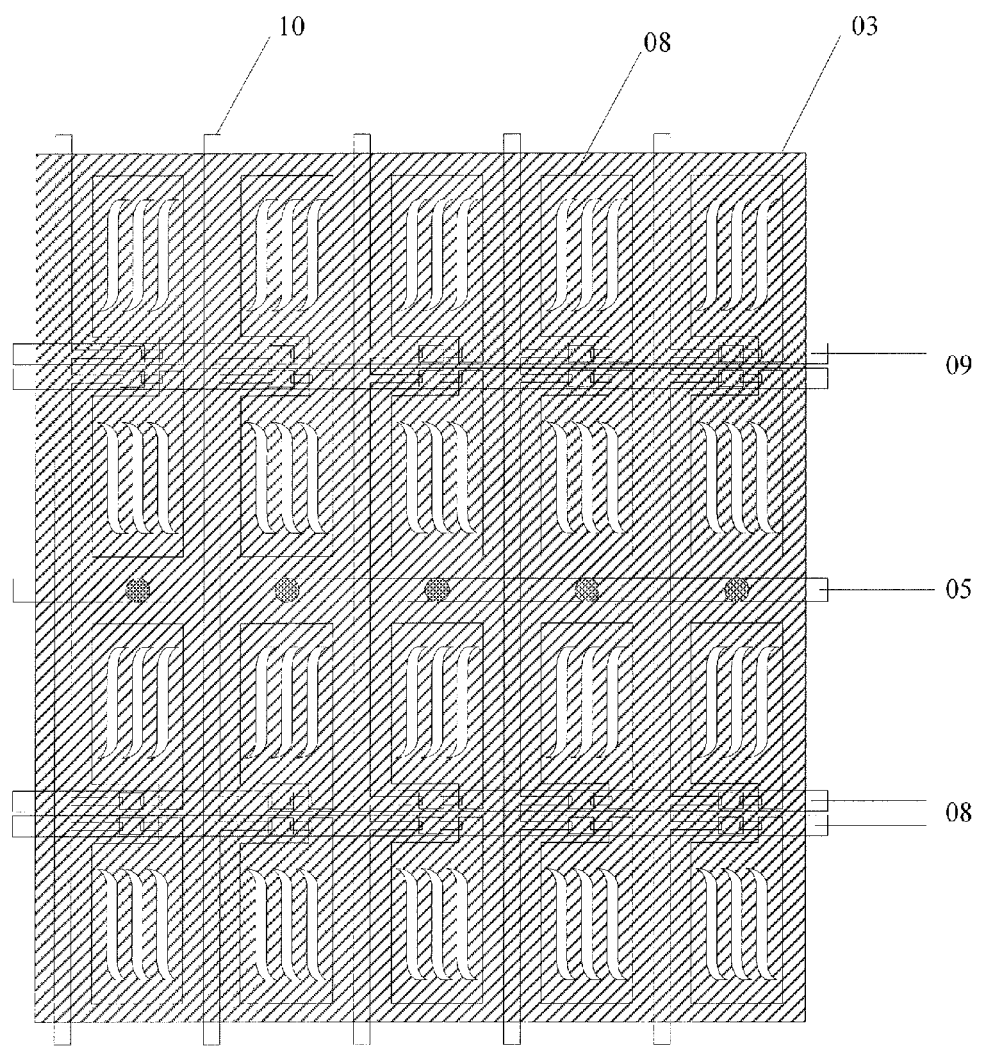
FIGS. 5 and 6 are respectively a schematic top view of the in-cell touch panel provided by an embodiment of the present invention.
Figure 6:
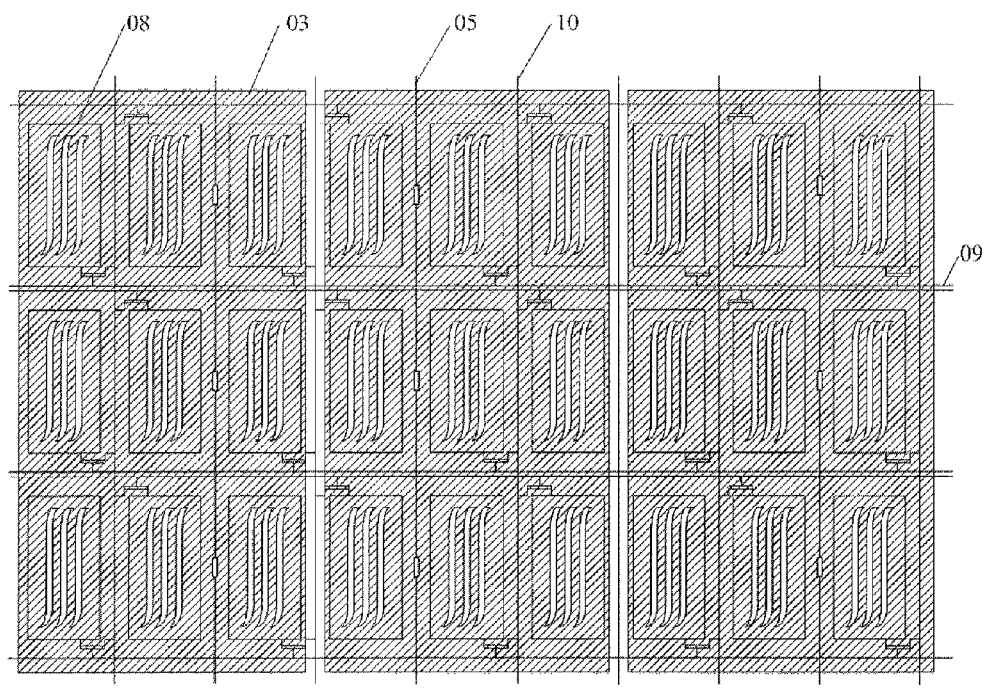

Moreover, as illustrated in FIGS. 5 and 6, the touch panel provided by at least one embodiment of the present invention may further comprise: gate signal lines 09 and data signal lines 10 which intersect each other and are disposed on one side of the lower substrate 02 facing the upper substrate 01. Two adjacent gate signal lines 09 and data signals lines 10 are encircled into a sub-pixel. Each sub-pixel includes a thin-film transistor (TFT) taken as a switching element, a common electrode and a pixel electrode. A gate electrode of the TFT is electrically connected with a corresponding gate line; a source electrode is electrically connected with a corresponding data line; and a drain electrode is electrically connected with the pixel electrode of a corresponding sub-pixel unit.

In order to connect the self-capacitance electrodes 03 and the touch detection chip 04 through the leads 05, the extension direction of the leads 05 may be set to be the same as that of the gate signal lines 09 or the data signal lines 10. Moreover, the extension direction of the leads is generally consistent with each other.

Moreover, in the touch panel provided by the embodiment of the present invention, in order to try not to add a new layer and ensure the productivity and reduce the manufacturing cost, the leads connected with the self-capacitance electrodes 03 are arranged in the same layer as the gate signal lines 09 or the data signal lines 10.

For instance, one embodiment of the present invention provides a possible implementation as described below. As illustrated in FIG. 5, on the lower substrate 02, every two adjacent rows of pixels are taken as a pixel group, and two gate signal lines 09 are disposed between the two rows of pixels and configured to provide gate scanning signals for the two rows of pixels respectively. The position of the gate signal lines 09 originally between adjacent pixel groups can be saved by changing the position of the gate signal lines 09 between the two adjacent rows of pixels and TFT switches. In this case, as illustrated in FIG. 5, the leads 05 may be disposed at gaps between adjacent pixel groups and are arranged in the same layer and extend in the same direction as the gate signal lines 09.

For instance, in the manufacturing process of the lower substrate 02, the gate signal lines 09 may be formed in the same layer as gate electrodes in the TFTs; the data signal lines 10 are generally formed in the same layer as source/drain electrodes in the TFTs; and a layer provided with the gate signal lines 09 may be disposed between a layer provided with the data signal lines 10 and the lower substrate 02. When the pixel electrode layer or the common electrode layer 07 is multiplexed as the self-capacitance electrodes 03, as can be seen, a plurality of layers are disposed between the self-capacitance electrodes 03 and the leads 05 connected therewith, and the self-capacitance electrodes 03 must be connected with the leads 05 disposed at the bottom via through holes running through the layers.

Figure 7:
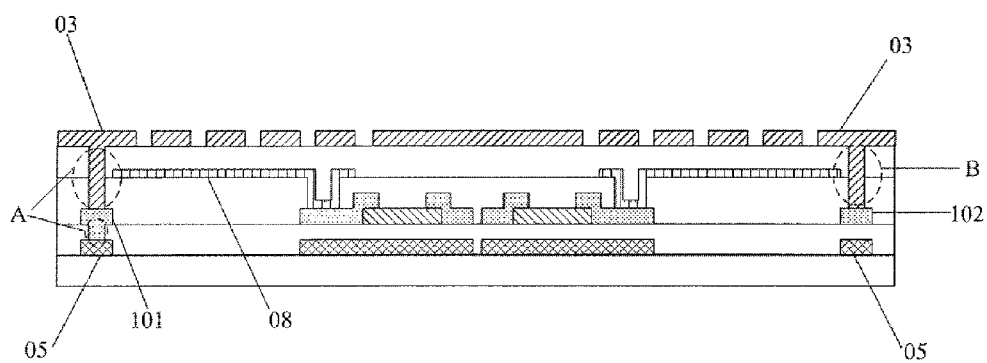
FIG. 7 is a schematic side view of an in-cell touch panel provided by another embodiment of the present invention.

Taking the case that the common electrode layer 07 is multiplexed as the self-capacitance electrodes 03 as an example, in the lower substrate 02, as illustrated in FIG. 7, first conducting portions 101 and second conducting portions 102 are arranged in the same layer as the data signal lines 10. FIG. 7 does not illustrate patterns of the data signal lines 10 but illustrates patterns of source/drain electrodes of TFTs arranged in the same layer as the data signal lines 10. The self-capacitance electrodes 03 and corresponding leads 05 are respectively electrically connected with the first conducting portions 101; the self-capacitance electrodes 03 are electrically connected with the second conducting portions 102 through the recessed portions B; but the leads 05 are insulated from the second conducting portions 102.

The first conducting portions 101 arranged in the same layer as the data signal lines 10 may ensure better top-to-bottom connection between the self-capacitance electrodes 03 and the leads 05. After the second conducting portions 102 arranged in the same layer as the data signal lines 10 are connected with the self-capacitance electrodes 03 through the recessed portions B in the interlayer insulating layer 06, on one hand, the sheet resistance of the self-capacitance electrodes 03 can be reduced as a whole, and on the other hand, the unnecessary etching of the interlayer insulating layer 06 due to excessive etching in the process of forming the recessed portions of the interlayer insulating layer 06 can be avoided, so that the self-capacitance electrodes 03 and the leads 05, which should not be connected with each other, are electrically connected, namely the second conducting portions 102 have the etching barrier function on the interlayer insulating layer 06.

For instance, another possible implementation provided by another embodiment of the present invention may be as follows. As illustrated in FIG. 6, a dual gate structure is adopted, and two gate signal lines 09 are disposed between adjacent rows of pixels; and every two adjacent columns of pixels are set to be a pixel group and share one data signal line 10 disposed between the two columns of pixels. The position of the data signal line 10 between adjacent pixel groups can be saved by doubling the number of the gate signal lines 09. In this case, as illustrated in FIG. 6, the leads 05 may be disposed at gaps between the adjacent pixel groups and are arranged in the same layer and extended in the same direction as the data signal lines 10.

For instance, as the pixel electrode layer is usually made from an ITO material, and the resistance of the ITO material is relatively high, in order to maximally reduce the resistance of the pixel electrode layer and improve the signal-to-noise ratio of the electrical signal transmission of the self-capacitance electrodes 03, the self-capacitance electrodes 03 and corresponding leads 05 may be electrically connected with each other via a plurality of through holes, which is equivalent to connect ITO electrodes and a plurality of metal resistors formed by the leads in parallel. In this way, the resistance of the electrodes can be maximally reduced, and hence the signal-to-noise ratio of the electrodes during the signal transmission can be improved.

For instance, any known patterning flow may be adopted to form layers on the lower substrate 02, for instance, eight (8) patterning processes may be adopted to obtain the lower substrate including a drive array: patterning for gate electrodes and gate lines, patterning for active layers, patterning for a first insulating layer, patterning for data lines and source/drain electrodes, patterning for a resin layer, patterning for pixel electrodes, patterning for a second insulating layer, and patterning for a common electrode layer. Of course, in the embodiment of the present invention, for instance, 7, 6 or 5 patterning processes may also be adopted according to actual design. No limitation will be given here.

At least one embodiment of the present invention further provides a display device, which comprises the in-cell touch panel provided by an embodiment of the present invention. The display device may be: any product or component with display function such as a mobile phone, a tablet PC, a TV, a display, a notebook computer, a digital picture frame and a navigator. The embodiments of the display device may refer to the embodiments of the in-cell touch panel. No further description will be given here.

In the in-cell touch panel and the display device, provided by at least one embodiment of the present invention, the plurality of mutually independent self-capacitance electrodes arranged in the same layer are disposed in accordance with the self-capacitance principle; the touch detection chip can determine the touch position by the detection of the capacitance variation of the self-capacitance electrodes in the touch period; the self-capacitance electrodes and the leads configured to connect the self-capacitance electrodes to the touch detection chip are arranged in different layers, and an interlayer insulating layer is disposed between the self-capacitance electrodes and the leads; the self-capacitance electrodes are electrically connected with the leads via the through holes running through the interlayer insulating layer; and the pseudo through holes are formed at the overlapped areas in the interlayer insulating layer, at which the self-capacitance electrodes and the leads are not connected with each other, namely the interlayer insulating layer is provided with the recessed portions at the overlapped areas of the self-capacitance electrodes and the leads other than the leads electrically connected with the self-capacitance electrodes. By the additional arrangement of the pseudo through holes matched with the through holes in the interlayer insulating layer, the pattern uniformity of the entire display area can be guaranteed, and hence the uniformity of display images of the touch panel can be improved.

The foregoing is only the preferred embodiments of the present invention and not intended to limit the scope of protection of the present invention. The scope of protection of the present invention should be defined by the appended claims.

The application claims priority to the Chinese patent application No. 201410240043.7, filed May 30, 2014, the disclosure of which is incorporated herein by reference as part of the application.

The invention claimed is:

1. An in-cell touch panel, comprising: an upper substrate and a lower substrate arranged opposite to each other, a plurality of mutually independent self-capacitance electrodes arranged in a same layer, and a plurality of leads configured to connect the self-capacitance electrodes to a touch detection chip, wherein
the self-capacitance electrodes and the leads are disposed on one side of the upper substrate facing the lower substrate or one side of the lower substrate facing the upper substrate;
the self-capacitance electrodes and the leads are arranged in different layers, and an interlayer insulating layer is disposed between the self-capacitance electrodes and the leads; and
the self-capacitance electrodes are electrically connected with the leads via through holes running through the interlayer insulating layer; and the interlayer insulating layer is provided with recessed portions at overlapped areas of the self-capacitance electrodes and the leads other than the leads electrically connected with the self-capacitance electrodes.

2. The in-cell touch panel according to claim 1, wherein the through holes and the recessed portions have consistent cross sectional shape and are uniformly distributed in the interlayer insulating layer.

3. The in-cell touch panel according to claim 2, wherein the self-capacitance electrodes are combined into a common electrode layer disposed on one side of the lower substrate facing the upper substrate; and in a display period, common electrode signals are applied to the self-capacitance electrodes.

4. The in-cell touch panel according to claim 2, wherein the self-capacitance electrodes and pixel electrodes on the lower substrate are arranged in a same layer; and a pattern of the self-capacitance electrode is disposed at a gap between two adjacent pixel electrodes.

5. The in-cell touch panel according to claim 2, further comprising: gate signal lines and data signal lines which intersect each other and are disposed between the lower substrate and a layer provided with the self-capacitance electrodes, in which two adjacent gate signal lines and adjacent data signal lines surround a sub-pixel; and
an extension direction of the leads is the same as that of the gate signal lines or the data signal lines.

6. The in-cell touch panel according to claim 5, wherein two adjacent rows of pixels are taken as a pixel group, two gate signal ones are disposed between the two adjacent rows of pixels and configured to provide gate scanning signals for the two adjacent rows of pixels respectively; and
the leads are disposed at gaps between adjacent pixel groups and arranged in a same layer as the gate signal lines.

7. The in-cell touch panel according to claim 6, wherein a layer provided with the gate signal lines is disposed between the lower substrate and a layer provided with the data signal lines;
first conducting portions and second conducting portions are arranged hi a same layer as the data signal lines;
the self-capacitance electrodes and corresponding leads are respectively electrically connected with the first conducting portions;
the self-capacitances are electrically connected with the second conducting portions through the recessed portions; and the leads and the second conducting portions are insulated from each other.

8. The in-cell touch panel according to claim 5, wherein two gate signal ones are disposed between adjacent rows of pixels; every two adjacent rows of pixels are taken as a pixel group and share a data signal line disposed between the two adjacent rows of pixels; and
the leads are disposed at gaps between adjacent pixel groups and arranged in a same layer as the data signal ones.

9. The in-cell touch panel according to claim 2, further comprising: a touch detection chip configured to determine a touch position by detection of capacitance variation of the self-capacitance electrode in a touch period.

10. The in-cell touch panel according to claim 1, wherein the self-capacitance electrodes are combined into a common electrode layer disposed on one side of the lower substrate facing the upper substrate; and in a display period, common electrode signals are applied to the self-capacitance electrodes.

11. The in-cell touch panel according to claim 10, further comprising: gate signal lines and data signal lines which intersect each other and are disposed between the lower substrate and a layer provided with the self-capacitance electrodes, in which two adjacent gate signal lines and adjacent data signal lines surround a sub-pixel; and
an extension direction of the leads is the same as that of the gate signal lines or the data signal lines.

12. The in-cell touch panel according to claim 10, further comprising: a touch detection chip configured to determine a touch position by detection of capacitance variation of the self-capacitance electrode in a touch period.

13. The in-cell touch panel according to claim 1, wherein the self-capacitance electrodes and pixel electrodes on the lower substrate are arranged in a same layer; and a pattern of the self-capacitance electrode is disposed at a gap between two adjacent pixel electrodes.

14. The in-cell touch panel according to claim 13, further comprising: gate signal lines and data signal lines which intersect each other and are disposed between the lower substrate and a layer provided with the self-capacitance electrodes, in which two adjacent gate signal lines and adjacent data signal lines surround a sub-pixel; and
an extension direction of the leads is the same as that of the gate signal lines or the data signal lines.

15. The in-cell touch panel according to claim 1, further comprising: gate signal lines and data signal lines which intersect each other and are disposed between the lower substrate and a layer provided with the self-capacitance electrodes, in which two adjacent gate signal lines and adjacent data signal lines surround a sub-pixel; and an extension direction of the leads is the same as that of the gate signal lines or the data signal lines.

16. The in-cell touch panel according to claim 15, wherein two adjacent rows of pixels are taken as a pixel group, two gate signal lines are disposed between the two adjacent rows of pixels and configured to provide gate scanning signals for the two adjacent rows of pixels respectively; and the leads are disposed at gaps between adjacent pixel groups and arranged in a same layer as the gate signal lines.

17. The in-cell touch panel according to claim 16, wherein a layer provided with the gate signal lines is disposed between the lower substrate and a layer provided with the data signal lines;

first conducting portions and second conducting portions are arranged in a same layer as the data signal lines;

the self-capacitance electrodes and corresponding leads are respectively electrically connected with the first conducting portions;

the self-capacitances are electrically connected with the second conducting portions through the recessed portions; and the leads and the second conducting portions are insulated from each other.

18. The in-cell touch panel according to claim 15, wherein two gate signal lines are disposed between adjacent rows of pixels: every two adjacent rows of pixels are taken as a pixel group and share a data signal line disposed between the two adjacent rows of pixels; and the leads are disposed at gaps between adjacent pixel groups and arranged in a same layer as the data signal lines.

19. The in-cell touch panel according to claim 1, further comprising: a touch detection chip configured to determine a touch position by detection of capacitance variation of the self-capacitance electrode in a touch period.

20. A display device, comprising the in-cell touch panel according to claim 1.

* * * * *